1## United States Patent

Stewart et al.

(10) Patent No.: US 9,430,045 B2
(45) Date of Patent: Aug. 30, 2016

(54) SPECIAL GESTURES FOR CAMERA CONTROL AND IMAGE PROCESSING OPERATIONS

(71) Applicant: Lenovo (Singapore) Pte. Ltd., Singapore (SG)

(72) Inventors: Aaron Michael Stewart, Raleigh, NC (US); Jeffrey E. Skinner, Raleigh, NC (US); Xin Feng, Arcadia, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 134 days.

(21) Appl. No.: 13/944,539

(22) Filed: Jul. 17, 2013

(65) Prior Publication Data

US 2015/0022432 A1    Jan. 22, 2015

(51) Int. Cl.
*G06F 3/01* (2006.01)
*G06F 3/03* (2006.01)
*G06F 3/0484* (2013.01)

(52) U.S. Cl.
CPC ............. *G06F 3/017* (2013.01); *G06F 3/0304* (2013.01); *G06F 3/04842* (2013.01); *G06F 3/04845* (2013.01); *G06F 2203/04806* (2013.01)

(58) Field of Classification Search
CPC ... G06F 3/017; G06F 3/0304; G06F 3/04845
USPC .............. 382/100; 345/156; 715/863
See application file for complete search history.

(56) References Cited

U.S. PATENT DOCUMENTS

| | | | |
|---|---|---|---|
| 8,018,579 B1* | 9/2011 | Krah | 356/4.01 |
| 8,837,780 B2* | 9/2014 | Jia et al. | 382/103 |
| 2004/0189720 A1* | 9/2004 | Wilson et al. | 345/863 |
| 2005/0094019 A1* | 5/2005 | Grosvenor | G03B 17/00 348/335 |
| 2010/0050133 A1* | 2/2010 | Nishihara et al. | 715/863 |
| 2011/0249019 A1* | 10/2011 | Chen | 345/593 |
| 2011/0310100 A1* | 12/2011 | Adimatyam et al. | 345/420 |
| 2011/0316763 A1* | 12/2011 | Yada | 345/8 |
| 2012/0200494 A1* | 8/2012 | Perski et al. | 345/156 |
| 2012/0249429 A1* | 10/2012 | Anderson et al. | 345/173 |
| 2013/0293454 A1* | 11/2013 | Jeon et al. | 345/156 |
| 2013/0314558 A1* | 11/2013 | Ju et al. | 348/208.99 |
| 2014/0169621 A1* | 6/2014 | Burr | 382/103 |
| 2014/0193030 A1* | 7/2014 | Burr | G06K 9/00355 382/103 |

OTHER PUBLICATIONS

Shiratuddin et al. ("Non-contact multi-hand gestures interaction techniques for architectural design in a virtual environment," Proceedings of the 5th Int'l Conf. on IT & Multimedia, Nov. 14-16, 2011).*

Chalechale et al. ("Hand gesture selection and recognition for visual-based human-machine interface," 2005 IEEE International Conference on Electro Information Technology, May 22-25, 2005).*

(Continued)

*Primary Examiner* — Yubin Hung
(74) *Attorney, Agent, or Firm* — Ference & Associates LLC (57) ABSTRACT

An embodiment provides a method, including: receiving at a sensor of an information handling device image input; determining, using one or more processors, a predetermined gesture within the image input; capturing additional gesture input associated with the predetermined gesture; and processing an image rendered on a display device according to the additional gesture input associated with the predetermined gesture. Other embodiments are described and claimed.

18 Claims, 4 Drawing Sheets

(56) References Cited

OTHER PUBLICATIONS

Xu et al. ("A real-time command system based on hand gesture recognition," 2011 7th Int'l Conf. on Natural Computation, pp. 1588-1592).*

Pang et al. ("A Real Time Vision-Based Hand Gesture Interaction," 2010 4th Asia Int'l Conf. on Mathematical Analytical Modelling and Computer Simulation, pp. 237-242).*

Mistry, Pranav, "The Thrilling Potential of SixthSense Technology", (Transcript of Video) TED.com (India); (available at: http://www.ted.com/talks/pranav_mistry_the_thrilling_potential_of_sixthsense_technology.html (last accessed Sep. 26, 2013); Nov. 2009, 6 pages.

* cited by examiner

SPECIAL GESTURES FOR CAMERA CONTROL AND IMAGE PROCESSING OPERATIONS

BACKGROUND

Information handling devices ("devices"), for example tablet devices, smart phones, laptop and desktop computers, etc., employ one or more input devices. Among these input devices are devices that utilize image processing to recognize gesture or pattern inputs. Existing input devices may for example utilize two dimensional (2D) or three dimensional (3D) camera(s) to capture images that are processed by an image processing system.

In an image processing system, image inputs, e.g., form a 2D camera, are utilized in vision or gesture algorithms convert the image inputs into commands. Thus, for example, a user may have his or her hand gestures tracked via a camera and converted into commands for operating various functions in a device. An example of image processing technology is that provided by eyesSight™ Mobile Technologies Ltd.

BRIEF SUMMARY

In summary, one aspect provides a method, comprising: receiving at a sensor of an information handling device image input; determining, using one or more processors, a predetermined gesture within the image input; capturing additional gesture input associated with the predetermined gesture; and processing an image rendered on a display device according to the additional gesture input associated with the predetermined gesture.

Another aspect provides an information handling device, comprising: a sensor; a display device; one or more processors; a memory device storing instructions accessible to the one or more processors, the instructions being executable by the one or more processors to: receive, at the sensor, image input; determine, using the one or more processors, a predetermined gesture within the image input; capture additional gesture input associated with the predetermined gesture; and process an image rendered on a display device according to the additional gesture input associated with the predetermined gesture.

A further aspect provides a program product, comprising: a storage medium having computer readable program code stored therewith, the computer readable program code comprising: computer readable program code configured to receive at a sensor of an information handling device image input; computer readable program code configured to determine, using one or more processors, a predetermined gesture within the image input; computer readable program code configured to capture additional gesture input associated with the predetermined gesture; and computer readable program code configured to process an image rendered on a display device according to the additional gesture input associated with the predetermined gesture.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-C) illustrates examples of special gestures for camera control and image processing operations.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

For information handling devices (e.g., smart phone, tablet, laptop, desktop, etc.) there is currently no way to control integrated camera(s) or image processing generally using gesture input. For example, in a device having an integrated camera, or stand-alone camera, there is no simple process to control the camera and adjust the camera settings. For devices without a keyboard or a mouse (e.g., smart phones, tablets and the like), it is challenging to manipulate the image as presented on a display device (e.g., perform crop and cut actions, panning within the image, zooming, rotating the image in 2D or 3D, etc). A user conventionally must use graphical user interface to change camera settings or perform such image processing operations. For devices with a touch screen, the user can achieve some functionality with touch inputs, although these are likewise non-intuitive.

A challenge with existing solutions is that a user has to break the usage of camera (e.g., video conference call, etc.) and shift his or her focus to a graphical user interface or touch interface in order to implement changes to how the image data is processed and/or displayed. There is currently no solution offering a seamless user experience which enables user control camera/image processing without breaking the usage of camera. Moreover, for many image processing techniques, only non-intuitive inputs are permitted for implementing various changes.

Accordingly, an embodiment provides technology that allows use of one or more predetermined gestures (also referred to herein as a special gesture) for camera control and executing image processing operations. The basic solution assumes an image sensor (e.g., 2D camera) is enabled and viewing the user. An embodiment will recognize a special gesture, which in one example described further herein consists of the user presenting a corner gesture (e.g., by holding one or two hands in an "L" pattern). An embodiment recognizing this special gesture will interpret its presence as an indication that user intends to manipulate the displayed image or perform an associated action (e.g., pan through the image, rotate the image, take a picture or video, etc.). Using the predetermined or special gesture as a trigger or indication that the user wishes to manipulate the image processing in some way, an embodiment facilitates in-line performance of such functions without disrupting the user's experience (e.g., requiring the user to enter a special settings portion of a camera applications, etc.).

The illustrated example embodiments will be best understood by reference to the figures. The following description is intended only by way of example, and simply illustrates certain example embodiments.

Figure 1:
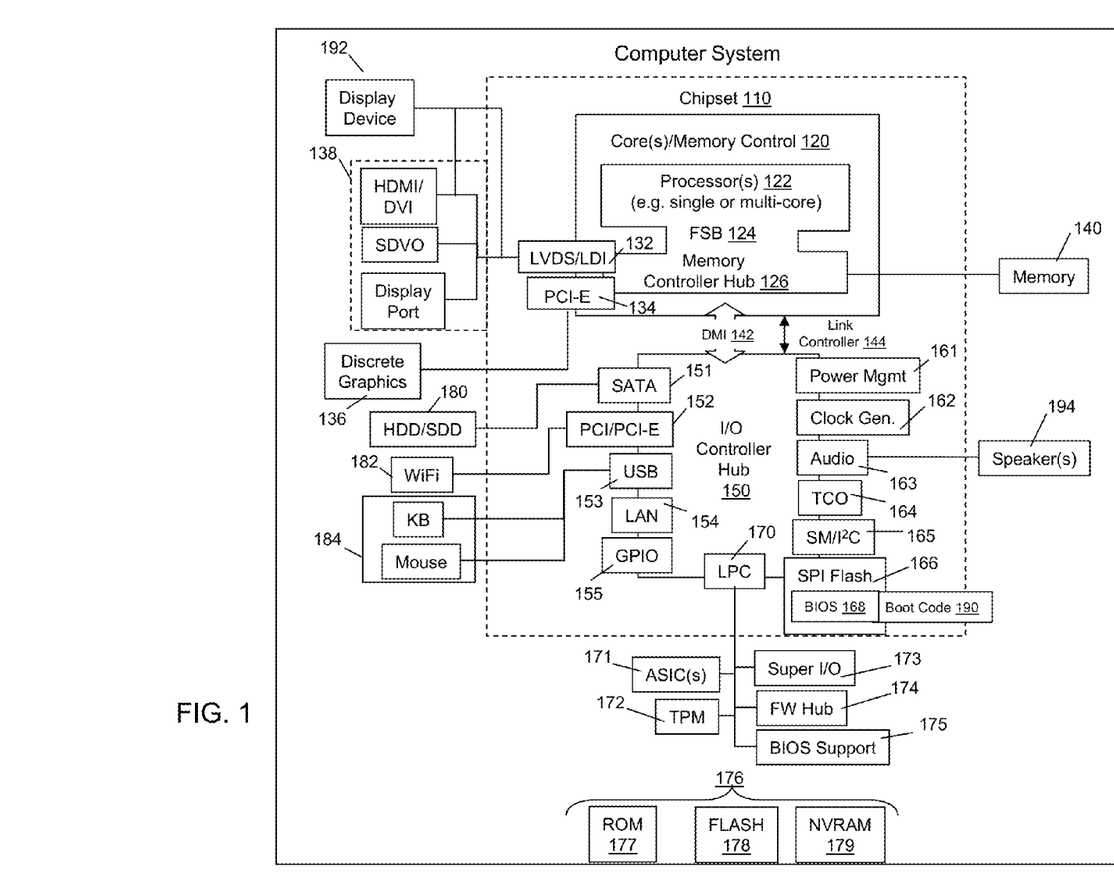
FIG. 1 illustrates an example of information handling device circuitry.
Figure 2:
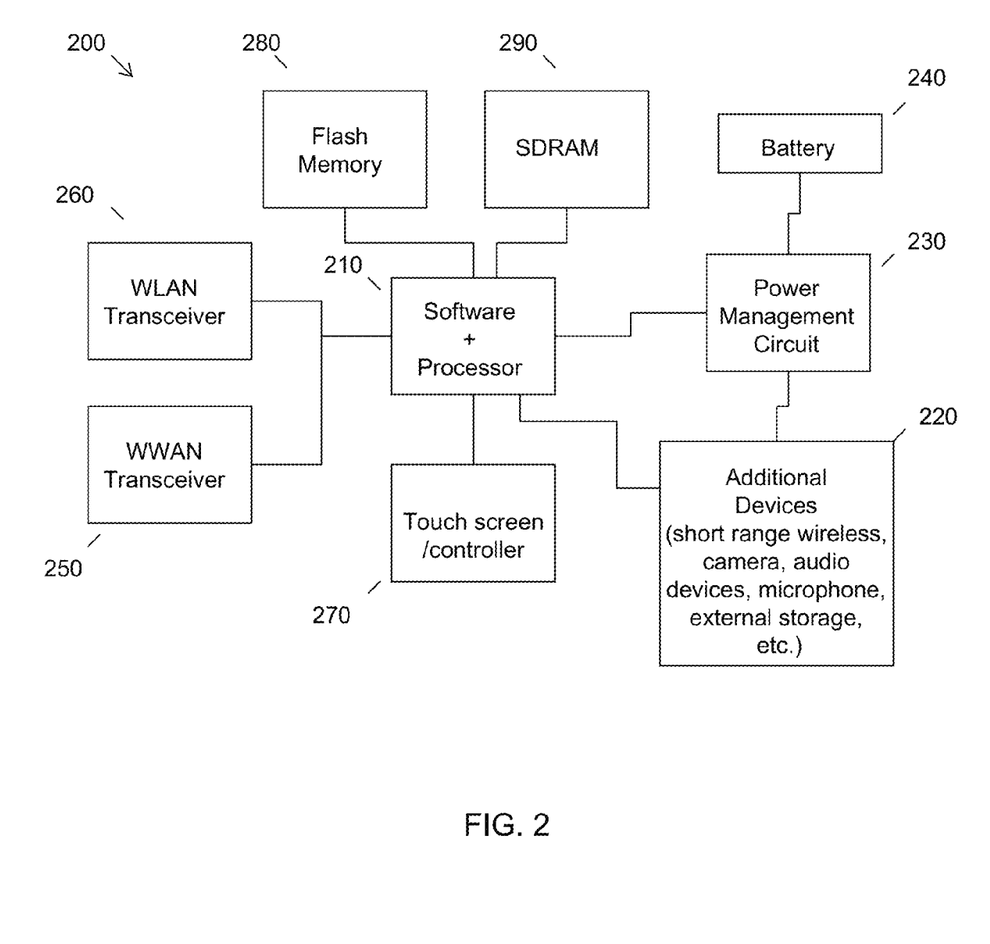
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes a system on a chip design found for example in tablet or other mobile computing platforms. Software and processor(s) are combined in a single chip 210. Internal busses and the like depend on different vendors, but essentially all the peripheral devices (220) such as a camera may attach to a single chip 210. In contrast to the circuitry illustrated in FIG. 1, the circuitry 200 combines the processor, memory control, and I/O controller hub all into a single chip 210. Also, systems 200 of this type do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

System 200 typically includes one or more of a WWAN transceiver 250 and a WLAN transceiver 260 for connecting to various networks, such as telecommunications networks and wireless base stations. Commonly, system 200 will include a touch screen 270 for data input and display. System 200 also typically includes various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may utilize image input as a trigger for implementing image processing, and may thereafter implement the changes using additional gesture input. For example, devices such as outlined in FIG. 1 and FIG. 2 may include an image sensor (e.g., a camera) that detects image data and provides it to a gesture engine for processing. The gesture engine, which may be a dedicated sub-system or stored in a memory of a device (or otherwise be accessible to a processor of the device), takes the image data as input, recognizes a special or predetermined gesture contained therein and implements various functionality on the basis of gestures that follow the special or predetermined gesture, as further described herein.

Figure 3:
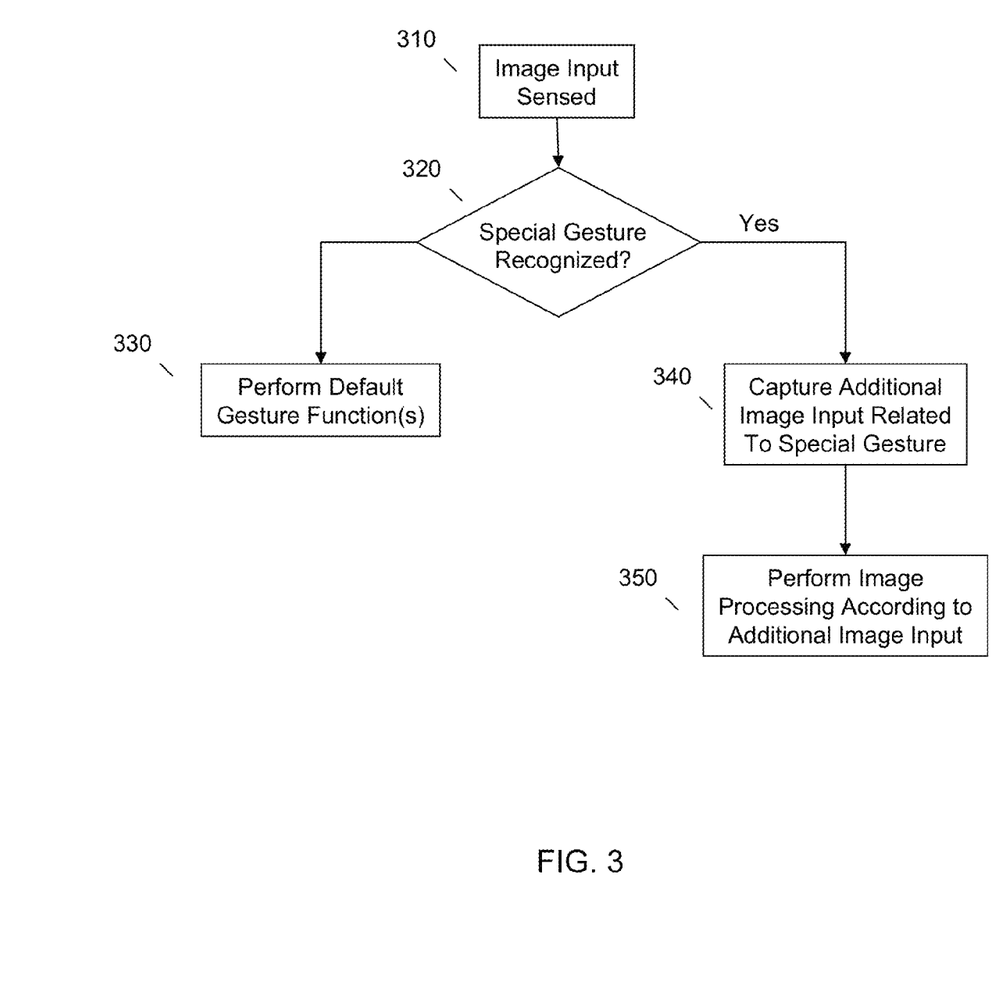
FIG. 3 illustrates an example method for using special gestures for camera control and image processing operations.

Referring to FIG. 3, an embodiment accepts image input at 310, for example as captured by a camera of a device. An embodiment analyzes the image input, i.e., for inclusion of a special gesture, at 320. An embodiment utilizes the inclusion or recognition of a special gesture as a decision point to alter gesture processing. Thus, if an embodiment does not recognize the presence of the special gesture in the image input at 320, the system may nonetheless continue processing default gesture inputs unrelated to the special gesture input (in the case where the device accepts some form of gesture input) at 330.

On the other hand, if an embodiment detects the presence of a special gesture input at 320, this serves as a trigger or initiation of further functionality as described further herein. In terms of what constitutes a special or predetermined gesture, an embodiment recognizes a predetermined pattern or gesture within the image data. In an embodiment, this pattern or gesture is predetermined as a special gesture such that an embodiment, after recognizing its presence, may implement the additional gesture based functionality for image processing. As will be understood by those having skill in the art, a pattern or gesture may be presented or input into the system in a variety of ways, including but not necessarily limited to presentation to the sensor/camera of an image itself containing a particular pattern, or a gesture sensed via a user holding one or two hands in a particular configuration for image capture by the sensor/camera.

If the special gesture is recognized at 320, an embodiment may thereafter capture additional image data that is thus related to the special gesture at 340, e.g., track the user's hands making the special gesture to ascertain changes thereto. In other words, the detection of the special gesture at 320 indicates that additional gesture input for performing image processing is imminent. Thus, the additional image input (e.g., captured by a sensor/camera) at 340 serves as the basis for implement additional gesture based functionality at 350.

Referring to FIG. 4(A-C) generally, an embodiment may recognize as the special gesture a corner pattern, e.g., such as an "L" pattern as formed via a user holding up a hand to form an "L" pattern. One or more "L" patterns may be utilized. Various non-limiting examples of capturing additional image input (e.g., at 340) and performing image processing according to the additional image input (e.g., at 350) are provided herein.

Once an image sensor captures a special gesture, e.g., static "L" pattern(s) provided by a user's hand, and this special gesture is recognized, e.g., by a gesture sub-system, an embodiment associates the "L" pattern's corner (and corners in the case of two "L" patterns) with a corner of a currently displayed image (including a static image or a video, e.g., a video stream for a video conference). By associating the corner of the "L" pattern with the corner of the image in question, an embodiment may provide convenient image processing to take place on the basis of further gesture input, as follows.

Figure 4A:
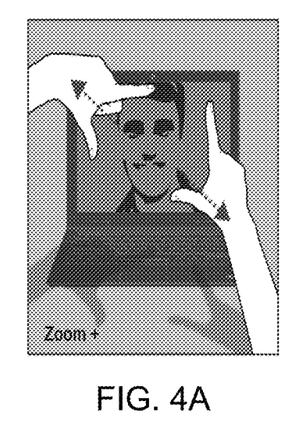

Referring to FIG. 4A, an embodiment detecting two "L" patterns may determine a distance (either literal or scaled/relative) between the users hands (e.g., corners formed by the two "L" patterns). This determined distance may be modified or changed by the user, e.g., increased x percent, and an embodiment will thereafter resize the image being displayed according to that change. For example, an embodiment may dynamically resize an image such as performing a zoom in or magnification function responsive to determining a user has moved the corners of the "L" patterns apart, as illustrated in FIG. 4A. Thus, a user may use two hands as a view finder such that an embodiment adjusts the image/video size proportionately to the distance between the user's two hands. Likewise, a user may similarly use two hands as a frame to crop the image, etc. Alternatively, an embodiment may utilize the distance (and changes therein) between the user's hands and the sensor/camera (i.e., towards or away from camera) to zoom in/out the image/video.

Figure 4B:
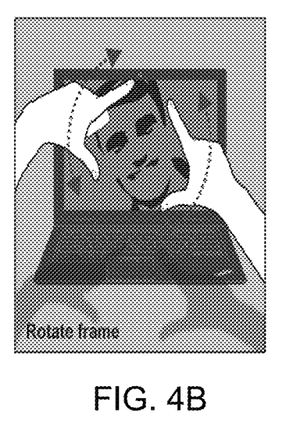
Figure 4C:
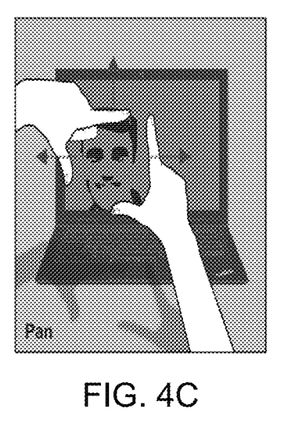

As shown in FIGS. 4B-C, the special gesture, here presented by two hands, may be have its movement tracked to implement corresponding control over the camera/image for image rotation and panning. As illustrated in the example of FIG. 4B, rotation of the hands is tracked an embodiment and corresponding rotation of the image is effected the same plane/surface. To pan, as illustrated in FIG. 4C, a user may move his or her hands in a horizontal or vertical direction with respect to the sensor (e.g., camera), and a corresponding panning functionality is effected in the rendering of the displayed image. Thus, the image may be panned in a direction that follows the hand movement direction. In this description, panning includes moving hands in the vertical direction.

Additionally, in the case where a user wishes to rotate an object in three dimensional fashion, a user may rotate the image in three dimensions using similar hand movements. To rotate a three dimensional image, the user would present the special gesture and thereafter tilt or rotate (in any direction of a 360 space) such that the corresponding image is therefore rotated. Thus, the gesture sub-system will rotate the image to match the rotation of the hands in 360 degrees. The special gesture, e.g., two hands forming two "L" patterns in a plane may thus be rotated about an axis and an embodiment will rotate the displayed image in a corresponding three dimensional fashion. This may be thought of as a form of "tilt", noting that it is essentially a rotation of the image in a three dimensional manner about a central axis defining a viewpoint.

In this respect, if a user rotates the plane of the special gesture (e.g., as formed by two hand configured in a double "L" special gesture) to vary the "z" distance from the camera (e.g., rotates the top of the double "L" plane towards the camera/sensor), an embodiment may keystone or warp the image that is displayed.

While the special gesture is provided, a user may provide additional gesture inputs to perform additional actions. For example, while presenting the special gesture in the form of a double "L" static pattern, a user may gesture with a finger to trigger an action, e.g., to trigger camera shot action for taking a picture by dropping a finger as if working a shutter or camera button. Various alternatives are of course available. For example, if the user holds the finger down for a time threshold an embodiment may capture a video, etc.

It should be noted that although examples utilizing two hands, each forming an "L" static gesture, have been used throughout, a user may provide a special gesture using one hand and, once recognized, use the other hand to rotate, zoom, pan, etc. Thus, a user may present one static "L" gesture with his or her left hand and thereafter provide gesture inputs via the right hand to indicate a panning direction, a zoom functionality desired, a rotation, an action to be triggered, etc.

Additionally, certain gesture engines have the ability to recognize very refined data contained in image input. For example, a gesture engine may be capable of determining if a user has a hand oriented with a palm facing the sensor/camera or the back of the hand oriented towards the sensor/camera (or a combination of the two in the case of a two handed special gesture). This additional input data may be processed by an embodiment to provide additional functionality, as follows.

In an example, for devices with both front and back facing cameras, the orientation of hand(s) can be used to switch control on cameras. That is, a user may indicate which image or device he or she wishes to process according to gesture inputs by defining the camera or image source to which processing is applied. As an example of this gesture implementation, when a user's palm is detected, the gesture may be interpreted as gesture input for controlling the camera which is viewing user. Alternatively, when the back of a user's hand is detected, the gesture may be interpreted as gesture input for controlling the camera which is front facing.

Accordingly, embodiments permit seamless control of images rendered on screen, including editing functions, by intelligently recognizing a special gesture indicative of a user's desire to control image processing with gesture input. Once a special gesture is detected, an embodiment implements certain predefined functions that are executed in response to additional gesture inputs associated with the special gestures. Various examples include panning, zooming, rotating, image/video capture, image warping/key-stoning and the like. In an embodiment, the various functionalities may be used simultaneously, e.g., zooming out while rotating, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    displaying an image on a display device of an information handling device;
    receiving, at a back facing sensor of the display device, image input;
    determining, using one or more processors, a predetermined gesture within the image input, wherein the predetermined gesture within the image input comprises one or more patterns including a corner, and wherein the corner of the one or more patterns is associated with a corresponding corner of the image displayed on the display device;
    activating, based on the predetermined gesture, an image processing mode for processing the image displayed on the display device;
    capturing, using the back facing sensor and after the activating, additional gesture input associated with the predetermined gesture; and
    processing the image displayed on the display device according to the additional gesture input.

2. The method of claim 1, wherein:
    the capturing additional gesture input comprises ascertaining gesture input in which a distance between two corners of the predetermined gesture has changed; and
    the processing comprises changing the size of the image displayed on the display device according to the change in distance between the two corners of the predetermined gesture.

3. The method of claim 1, wherein:
    the capturing additional gesture input comprises ascertaining gesture input in which a corner of the predetermined gesture has rotated in a plane substantially parallel to the sensor; and
    the processing comprises rotating the image displayed on the display device according to rotation of the predetermined gesture.

4. The method of claim 1, wherein:
    the capturing additional gesture input comprises ascertaining gesture input where the predetermined gesture forms a plane and is rotated about a central point; and
    the processing comprises rotating the image displayed on the display device in a three dimensional fashion according to rotation of the predetermined gesture.

5. The method of claim 1, wherein:
the capturing additional gesture input comprises ascertaining an additional gesture input associated with a predetermined capture action; and
the processing comprises storing image data at a time of receipt of the additional gesture input associated with the predetermined capture action.

6. The method of claim 5, wherein the predetermined capture action is selected from the group consisting of an image capture action and a video capture action.

7. The method of claim 1, wherein:
the capturing additional gesture input comprises ascertaining an additional gesture input associated with a crop action; and
the processing comprises cropping the image displayed on the display device at a time of receipt of the additional gesture input associated with the crop action.

8. The method of claim 1, wherein determining, using one or more processors, a predetermined gesture within the image input comprises ascertaining a directionality of the predetermined gesture.

9. The method of claim 8, wherein the information handling device comprises two or more cameras, the back facing sensor comprises a camera, and the directionality indicates a camera selected from the two or more cameras to which the processing is applied.

10. An information handling device, comprising:
a display device including a back facing sensor;
one or more processors;
a memory device storing instructions accessible to the one or more processors, the instructions being executable by the one or more processors to:
display, on the display device, an image;
receive, at the front facing sensor, image input;
determine, using the one or more processors, a predetermined gesture within the image input wherein the predetermined gesture within the image input comprises one or more patterns including a corner, and wherein the corner of the one or more patterns is associated with a corresponding corner of the image displayed on the display device;
activate, based on the predetermined gesture, an image processing mode for processing the image displayed on the display device;
capture, using the back facing sensor and after activating the image processing mode, additional gesture input associated with the predetermined gesture; and
process the image displayed on the display device according to the additional gesture input.

11. The information handling device of claim 10, wherein:
to capture additional gesture input comprises ascertaining gesture input in which a distance between two corners of the predetermined gesture has changed; and
to process comprises changing the size of the image displayed on the display device according to the change in distance between the two corners of the predetermined gesture.

12. The information handling device of claim 10, wherein:
to capture additional gesture input comprises ascertaining gesture input in which a corner of the predetermined gesture has rotated in a plane substantially parallel to the sensor; and to process comprises rotating the image displayed on the display device according to rotation of the predetermined gesture.

13. The information handling device of claim 10, wherein:
to capture additional gesture input comprises ascertaining gesture input where the predetermined gesture forms a plane and is rotated about a central point; and
to process comprises rotating the image displayed on the display device in a three dimensional fashion according to rotation of the predetermined gesture.

14. The information handling device of claim 10, wherein:
to capture additional gesture input comprises ascertaining an additional gesture input associated with a predetermined capture action; and
to process comprises storing image data at a time of receipt of the additional gesture input associated with the predetermined capture action.

15. The information handling device of claim 14, wherein the predetermined capture action is selected from the group consisting of an image capture action and a video capture action.

16. The information handling device of claim 10, wherein:
to capture additional gesture input comprises ascertaining an additional gesture input associated with a crop action; and
to process comprises cropping the image displayed on the display device at a time of receipt of the additional gesture input associated with the crop action.

17. The information handling device of claim 10, wherein to determine, the using one or more processors, a predetermined gesture within the image input comprises ascertaining a directionality of the predetermined gesture.

18. A program product, comprising:
a storage device having computer readable program code stored therewith, the computer readable program code being executable by a processor and comprising:
computer readable program code that displays an image on a display device of an information handling device;
computer readable program code that receives at a back facing sensor image input;
computer readable program code that determines a predetermined gesture within the image input wherein the predetermined gesture within the image input comprises one or more patterns including a corner, and wherein the corner of the one or more patterns is associated with a corresponding corner of the image displayed on the display device;
computer readable program code that activates, based on the predetermined gesture, an image processing mode for processing the image displayed on the display device;
computer readable program code that captures, using the back facing sensor and after activating the image processing mode, additional gesture input associated with the predetermined gesture; and
computer readable program code that processes the image displayed on the display device according to the additional gesture input.

* * * * *